United States Patent Office 2,720,446
Patented Oct. 11, 1955

2,720,446

FREE-FLOWING AMMONIUM NITRATE

John Whetstone and Niall A. R. Bell, West Kilbride, Scotland, assignors to Imperial Chemical Industries Limited, a corporation of Great Britain No Drawing. Application September 10, 1951,
Serial No. 245,966

Claims priority, application Great Britain
September 25, 1950

7 Claims. (Cl. 23—103)

The present invention relates to improvements in ammonium nitrate in which the tendency towards caking or setting of the salt is reduced by the presence on the crystals of at least one dyestuff of sulphonated aromatic character soluble to the extent of at least 0.01% in a saturated aqueous ammmonium nitrate solution at 20° C., as for example, the modified ammonium nitrate as described and claimed in British patent specifications Nos. 625,077 and 627,680 and as claimed in United States application Serial No. 104,389 to John Whetstone, filed July 12, 1949, now Patent No. 2,616,786, issued November 4, 1952.

In British patent specification No. 625,077 there is described and claimed inter alia modified ammonium nitrate consisting of a mixture of 100 parts of ammonium nitrate and 0.01 to 1.0 part of acid magenta (Colour Index No. 692).

In British specification No. 627,680 there is described and claimed inter alia ammonium nitrate consisting of a mixture of 100 parts of ammonium nitrate and 0.01 to 1.0 part of at least one dyestuff of sulphonated aromatic character, other than acid magenta (Colour Index No. 692), which is soluble to the extent of at least 0.01% in a saturated aqueous ammonium nitrate solution at 20° C. and induces the crystallisation of ammonium nitrate IV in {010} prisms, laths, plates or scales instead of the usual {110} elongated prisms or needles from aqueous ammonium nitrate solutions containing the dyestuff in solution.

In United States application Serial No. 104,389 to John Whetstone, filed July 12, 1949, now Patent No. 2,616,786, issued November 4, 1952 there is claimed inter alia ammonium nitrate of reduced tendency to caking or setting on storage consisting of ammonium nitrate particles whereof every 100 parts by weight carry on their surfaces a deposit of 0.0001 to 1.0 part by weight of a soluble salt of a poly-sulphonated derivative of a triamino substituted triaryl methane dyestuff or a lower N-alkyl mono substituted derivative thereof, the aryl groups of which are phenyl or tolyl groups or any combination of these, such dyestuff being other than acid magenta (Colour Index No. 692).

Although the aforesaid dyestuffs of sulphonated aromatic character are effective on the crystal habit of the form of ammonium nitrate normally stable between −18° and +32° C. known as ammonium nitrate IV the said dyestuffs may not be effective or equally as effective at temperatures above 32° C.

The object of the present invention is to provide a process of decreasing the cohesive tendency particularly at temperatures above 32° C., i. e. the transition temperature between the two orthorhombic modifications III and IV of ammonium nitrate, of ammonium nitrate surface-coated with at least one dyestuff of sulphonated aromatic character soluble to the extent of at least 0.01% in a saturated ammonium nitrate solution at 20° C. and which modifies the crystal habit of ammonium nitrate IV as described in British specification 627,680.

It is considered that any tendency to cake which ammonium nitrate surface-coated with such a dyestuff of sulphonated aromatic character may still show after exposure to moisture at temperatures above 32° C. is largely due to recrystallisation as ammonium nitrate III, which does not undergo habit change comparable with ammonium nitrate IV, of surface films of saturated solution concentrated between the contiguous particles of the salt by capillary forces. If then the capillary attractive forces between the contiguous particles of the salt can be reduced the consequent attenuation of the cross-sectional area of the links of saturated solution between the contiguous particles should minimise any caking of the surface-dyed ammonium nitrate occurring at temperatures above 32° C. The inclusion of a surface tension reducing agent soluble in a saturated solution of ammonium nitrate in the surface of the crystals of surface-dyed ammonium nitrate has in fact been experimentally ascertained to be effective in reducing this tendency to cake at temperatures above 32° C., and also to improve the free-running qualities of the treated salt at all temperatures.

According to the present invention, therefore, ammonium nitrate of reduced tendency to caking or setting on storage consists of ammonium nitrate particles whereof every 100 parts by weight carry on their surfaces a coating of 0.0001 to 1.0 part of at least one dyestuff of sulphonated aromatic character which is soluble to the extent of at least 0.01% in a saturated aqueous ammonium nitrate solution at 20° C. and induces the crystallisation of ammonium nitrate IV in {010} prisms, laths, plates or scales instead of the usual {110} elongated prisms or needles from aqueous ammonium nitrate solutions containing the dyestuff in solution, as well as of a surface-active compound soluble in a saturated solution of ammonium nitrate and having the property of reducing its surface tension.

Ammonium nitrate according to the invention can be produced, for example, by effecting direct crystallisation of ammonium nitrate from solution containing the dyestuff and the surface-active compound or by effecting granulation of aqueous solutions of ammonium nitrate containing the dyestuff and the surface-active compound.

Another method for the production of ammonium nitrate according to the invention comprises adding 0.001 to 1.0 part of the dyestuff and a quantity ranging from 0.0005 to 0.01 part of the surface-active compound by dry admixture to 100 parts of spray crystallised ammonium nitrate.

Examples of suitable dyestuffs of sulphonated aromatic character are acid magenta (Rowe's Colour Index No. 692), which is the sulphonated dyestuff comprising a mixture of salts of the di- and tri-sulphonic acids of pararosaniline and rosaniline, said salts being selected from the sodium and ammonium salts of said sulphonated compounds, sodium or ammonium salt of trisulphonated new magenta (new magenta is the dyestuff referred to in Rowe's Colour Index as No. 678), which is the ammonium or sodium salt of trisulphonic acid of triamino-tri-tolyl carbinol anhydride, amaranth (Rowe's Colour Index No. 184), which chemically is the sodium salt of 4-sulpho-naphthalene-azo - naphthol-3.6 disulphonic acid ($C_{20}H_{11}N_2O_{10}S_3Na_3$), sodium or ammonium salt of trisulphonated pararosaniline (Rowe's Colour Index No. 676), red violet 5RS (Rowe's Colour Index No. 693), which is the trisulphonate of mono-ethyl-diamino-diphenyl-tolyl carbinol anhydride, and sodium or ammonium salt of 1:4 diamino anthraquinone 2 sulphonic acid.

Preferably the said surface-active compound is one capable of reducing the surface tension at 20° C., of a saturated ammonium nitrate solution from 85 dynes per cm. to a value not exceeding 50 dynes per cm.

Examples of surface tension reducing surface-active compounds suitable for use according to the invention include the di-octyl ester of the sodium salt of sulphosuccinic acid, sodium lauryl sulphate and the impure form of this consisting of the sodium salts of the acid sulphates of a mixture of alcohols obtained by reducing coconut oil fatty acids, the sodium salts of sulphonated methyl oleate, the sodium salt of isopropyl naphthalene sulphonic acid, the sodium salt of oleyl para-anisidine ortho-sulphonic acid, and the sodium salts of para-secondary octyl phenyl di-hydrogen phosphate and of para-secondary octyl phenyl hydrogen methyl phosphate.

The surface tension reducing capacity of several of the above mentioned surface-active compounds for 60% ammonium nitrate solution at 20° C. is as follows:

|  | Dynes/cm. |
|---|---|
| No surface-active compound | 85 |
| 0.1% di-octyl ester of sodium sulpho-succinic acid | 30 |
| 0.1% sodium lauryl sulphate containing product from reduced coconut oil fatty acids | 28 |
| Sodium salt of isopropyl naphthalene sulphonic acid | 32 |
| Sodium oleyl para-anisidine ortha-sulphonate | 29 |

The following table shows the effect of the inclusion of sodium oleyl para-anisidine ortho-sulphonate on the setting of ammonium nitrate treated with a specified dyestuff.

*Table*

| Mixture | Sodium oleyl p-anisidine o-sulphonate content | Moisture content | Hardness | Moisture content | Hardness | Moisture content | Hardness | Moisture content | Hardness |
|---|---|---|---|---|---|---|---|---|---|
|  | Percent | Percent | Lbs. | Percent | Lbs. | Percent | Lbs. | Percent | Lbs. |
| 60 mesh ammonium nitrate |  | 0.14 |  | 0.58 |  | 1.14 |  | 1.49 | 4 |
| .05% Acid Magenta | .005 | 0.14 | 2 | 0.52 | 2 | 1.10 | 3 | 1.5 | 3 |
| 60 mesh ammonium nitrate |  | 0.19 | 1 | 0.38 | 1 | 0.48 | 1 | 0.5 | 8 |
| .10% Amaranth | 0.01 | 0.16 | 5 | 0.43 | 5 | 1.0 | 7 | 2.5 | 4 |
| 60 mesh ammonium nitrate |  | 0.21 | 1 |  | 2 | 0.58 | 4 |  |  |
| 0.10% 1:4 diamino anthraquinone 2-sodium sulphonate | 0.01 | 0.10 | 6 | 0.5 |  | 1.5 | 11 |  |  |
| 60 mesh ammonium nitrate |  | 0.29 | 1 | 0.58 | 3 |  | 3 | 3.64 | 18+ |
|  |  |  | 13 |  | 8+ |  |  |  |  |

The setting test is carried out by exposing a weighed cartridge of 50 grams of treated ammonium nitrate in porous paper to atmospheres of 90% relative humidity for different periods. The cartridges are dried at 20° C. after exposure and the hardness is measured by a penetrometer.

The following comparative data:

|  | Moisture content, percent | Hardness |
|---|---|---|
| Ammonium nitrate+0.05% Acid Magenta | 0.08 | 18 |
|  | 0.28 | 18 |
| Ammonium nitrate+0.05% Acid Magenta+ .005% sodium oleyl para-anisidine ortho-sulphonate | 0.1 | 7 |
|  | 0.3 | 13 |
|  | 0.54 | 18 |
|  | 0.92 | 18 | obtained by submitting laboratory samples of ammonium nitrate treated with 0.05% acid magenta and ammonium nitrate treated with 0.05% acid magenta and 0.005% sodium oleyl para-anisidine ortho-sulphonate to an atmosphere of 90% relative humidity for different periods with subsequent drying at 40° C. show the improvement obtained due to the presence of the wetting agent even under these conditions which are far more stringent than plant conditions. Under these laboratory conditions the ammonium nitrate forms a saturated solution at 40° C. in the absorbed water and on subsequent drying crystallisation takes place completely as ammonium nitrate III whereas under plant conditions only a portion of the saturated solution contained in a bulk of ammonium nitrate on cooling, crystallises above 32° C. as ammonium nitrate III and the remainder crystallises below 32° C. as ammonium nitrate IV.

Ammonium nitrate modified in accordance with the invention is found to be particularly suitable for use in explosive compositions.

The invention is further illustrated by the following examples in which the parts and percentages are by weight.

EXAMPLE 1

100 parts ammonium nitrate granules prepared by a spray crystallisation process are sprayed, as the material enters a rotary drier while still at a temperature above 100° C., with 0.5 parts of an aqueous solution containing 10% of the ammonium salt of trisulphonated new magenta (new magenta is the dyestuff referred to in Rowe's Colour Index as No. 678) and 1% of the sodium salt of oleyl para-anisidine ortho-sulphonic acid. The dried salt that emerges from the drier at 40° C. does not cake perceptibly on cooling through the transition point at 32.3° C. to room temperature of say 20° C. The free running properties of bagged ammonium nitrate treated in accordance with this example last until the material becomes too moist to be serviceable. The flowing properties in a slightly damp atmosphere after storage for a few days in bulk are better than those of ammonium nitrate similarly treated with the aforesaid dyestuff alone, in that the latter tends to cake within a few hours when collected in bulk at 40° C. and allowed to cool, although it does not do this when it is collected in 50 kg. bags that individually cool rapidly to room temperature.

In place of the sodium oleyl para-anisidine ortho-sulphonate there may successfully be substituted similar amounts of the di-octyl ester of sodium sulpho-succinic acid, the sodium salt of isopropyl naphthalene sulphonic acid and an impure sodium lauryl sulphate product obtained from coconut oil fatty acids; all with substantially similar results.

EXAMPLE 2

The procedure is the same as in Example 1 except that the same amount of dyestuff amaranth (Rowe's Colour Index No. 184) is substituted for the ammonium salt of trisulphonated new magenta (Amaranth is relatively less affected by traces of ammonia). The product treated with both the Amaranth and the sodium salt of sodium oleyl para-anisidine ortho-sulphonate is not so good in running properties as that described in Example 1 containing both the surface-active compound and the dyestuff, but is about the same as that containing 0.05% sulphonated new magenta alone and much superior to ammonium nitrate treated with amaranth alone, even when 0.2% of the dye is used.

EXAMPLE 3

An aqueous ammonium nitrate solution of 96.8% ammonium nitrate content at 140° C. is discharged into a graining kettle consisting of a cylindrical water jacketed open pan, equipped with a rotating stirrer or plough, just clearing the bottom. As the solution cools, at 133°

C., crystallisation starts, and the heat of crystallisation progressively drives off the contained water, until at 1% moisture content a stiff magma of ammonium nitrate crystals suspended in the mother liquor is present. At this point 0.03% of acid magenta (Colour Index No. 692) and 0.003% of the sodium salt of oleyl para-anisidine ortho-sulphonic acid, both in finely powdered form (weights calculated on the ammonium nitrate) are added dry to the contents of the graining kettle. As the ploughs rotate, the dye and surface-active agent are mixed intimately with the already separated crystals and dissolve in the mother liquor present, which coats the crystals. As cooling continues the further heats of crystallisation, plus heats of transition at 125° C. and 84° C., serve to drive off the remaining water, and a dry product consisting of ammonium nitrate crystals in aggregates, coated with acid magenta and the sodium salt of oleyl para-anisidine ortho-sulphonic acid, is obtained, which resists setting on cooling and over prolonged periods of storage.

What we claim is:

1. A free flowing ammonium nitrate comprising crystals of ammonium nitrate containing per 100 parts of ammonium nitrate, from 0.0001 to 1.0 part of at least one sulphonated aromatic dyestuff predominantly distributed on the surface of said crystals which is soluble to the extent of at least 0.01% in a saturated aqueous ammonium nitrate solution at 20° C. and which in solution in a saturated aqueous solution of ammonium nitrate at 20° C., conditions said solution to produce on crystallization in the temperature range in which the stable form of ammonium nitrate is ammonium nitrate IV, crystals of ammonium nitrate IV as [010] prisms, laths, plates or scales, to thereby lower the tendency of ammonium nitrate to set at temperatures below 32° C., and also containing on the surface of said crystals a small quantity of a surface active compound soluble in a saturated solution of ammonium nitrate and having the property of reducing the surface tension at 20° C. of a saturated ammonium nitrate solution from 85 dynes per cm. to a value not exceeding 50 dynes per cm. to thereby lower in the presence of said dyestuff the tendency of ammonium nitrate to set at temperatures above 32° C., and to increase the effect of said dyestuff below 32° C.

2. A free flowing ammonium nitrate as recited in claim 1 in which the said surface active compound is present in an amount of from 0.0005 to 0.01 part per 100 parts of the said ammonium nitrate.

3. A free flowing ammonium nitrate as recited in claim 1 in which the sulphonated aromatic dyestuff is the sulphonated dyestuff comprising a mixture of salts of the di- and tri-sulphonic acids of pararosaniline and rosaniline, salts being selected from the group consisting of the sodium and ammonium salts.

4. A free flowing ammonium nitrate as recited in claim 1 in which the said sulphonated aromatic dyestuff is selected from the group consisting of the sodium and ammonium salt of trisulphonic acid of triamino-tritolyl carbinol anhydride.

5. A free flowing ammonium nitrate as recited in claim 1 in which the said surface active compound is the sodium salt of oleyl para-anisidine ortho-sulphonic acid.

6. A free flowing ammonium nitrate comprising crystals of ammonium nitrate containing per 100 parts of ammonium nitrate, from 0.0001 to 1.0 part of at least one sulphonated aromatic dyestuff predominantly distributed on the surface of said crystals which is soluble to the extent of at least 0.01% in a saturated aqueous ammonium nitrate solution at 20° C. and which in solution in a saturated aqueous solution of ammonium nitrate at 20° C., conditions said solution to produce on crystallization in the temperature range in which the stable form of ammonium nitrate is ammonium nitrate IV, crystals of ammonium nitrate IV as [010] prisms, laths, plates or scales, to thereby lower the tendency of ammonium nitrate to set at temperatures below 32° C., and also containing on the surface of said crystals a small quantity of a surface active compound selected from the group consisting of the sodium salt of oleyl para-anisidine ortho-sulphonic acid, the di-octyl ester of the sodium salt of sulpho-succinic acid, sodium lauryl sulphate, the sodium salts of sulphonated methyl oleyl, the sodium salts of para-secondary octyl phenyl di-hydrogen phosphate and the sodium salts of para-secondary octyl phenyl hydrogen methyl phosphate, said surface active compound being soluble in a saturated solution of ammonium nitrate and capable of reducing the surface tension at 20° C. of a saturated ammonium nitrate solution from 85 dynes per cm. to a value not exceeding 50 dynes per cm., to thereby lower in the presence of said dyestuff the tendency of ammonium nitrate to set at temperatures above 32° C. and to increase the effect of said dyestuff below 32° C.

7. A free flowing ammonium nitrate comprising crystals of ammonium nitrate containing per 100 parts of ammonium nitrate, from 0.0001 to 1.0 part of at least one sulphonated aromatic dyestuff predominantly distributed on the surface of said crystals which is soluble to the extent of at least 0.01% in a saturated aqueous ammonium nitrate solution at 20° C. and which in solution in a saturated aqueous solution of ammonium nitrate at 20° C., conditions said solution to produce on crystallization in the temperature range in which the stable form of ammonium nitrate is ammonium nitrate IV, crystals of ammonium nitrate IV as [010] prisms, laths, plates or scales, to thereby lower the tendency of ammonium nitrate to set at temperatures below 32° C., and also containing on the surface of said crystals a small quantity of a surface active compound selected from the group consisting of the sodium salt of oleyl para-anisidine ortho-sulphonic acid, the di-octyl ester of the sodium salt of sulpho-succinic acid, sodium lauryl sulphate, the sodium salts of sulphonated methyl oleyl, the sodium salts of para-secondary octyl phenyl di-hydrogen phosphate and the sodium salts of para-secondary octyl phenyl hydrogen methyl phosphate, said surface active compound being soluble in a saturated solution of ammonium nitrate and being present in an amount of from 0.0005 to 0.01 part per 100 parts of the said ammonium nitrate, to thereby lower in the presence of said dyestuff the tendency of ammonium nitrate to set at temperatures above 32° C. and to increase the effect of said dyestuff below 32° C.

References Cited in the file of this patent

UNITED STATES PATENTS

| | | |
|---|---|---|
| 1,056,365 | Raschig | Mar. 18, 1913 |
| 1,550,064 | Ehrlich | Aug. 18, 1925 |
| 2,115,851 | Handforth | May 3, 1938 |
| 2,399,987 | Cordie | May 7, 1946 |
| 2,402,192 | Williams | June 18, 1946 |
| 2,408,059 | Garfield | Sept. 24, 1946 |
| 2,413,491 | Fajans | Dec. 31, 1946 |
| 2,480,694 | Atwood | Aug. 30, 1949 |
| 2,616,785 | Butchart | Nov. 4, 1952 |
| 2,616,787 | Whetstone et al. | Nov. 4, 1952 |

FOREIGN PATENTS

| | | |
|---|---|---|
| 625,077 | Great Britain | June 21, 1949 |
| 627,680 | Great Britain | Aug. 12, 1949 |